Oct. 23, 1951     R. J. PEARSE     2,572,379
PORTABLE FOUNTAIN
Filed Aug. 22, 1945     2 SHEETS—SHEET 1
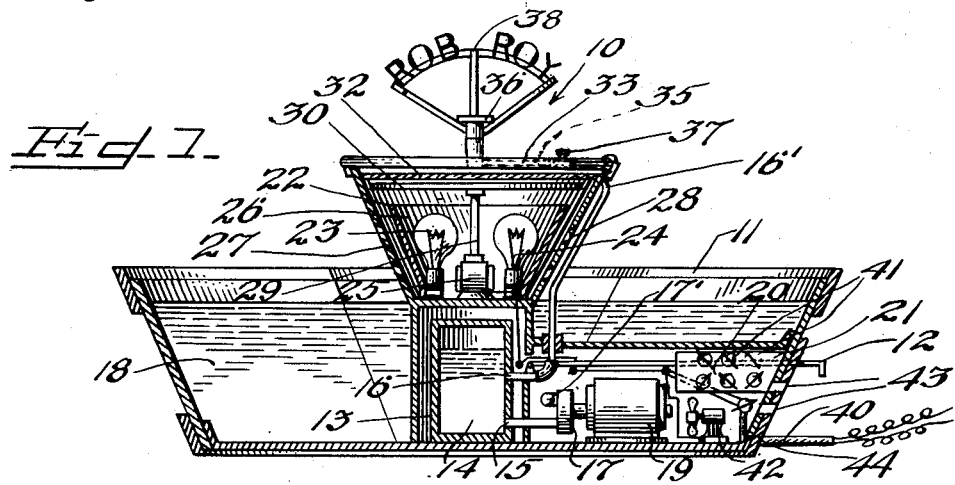
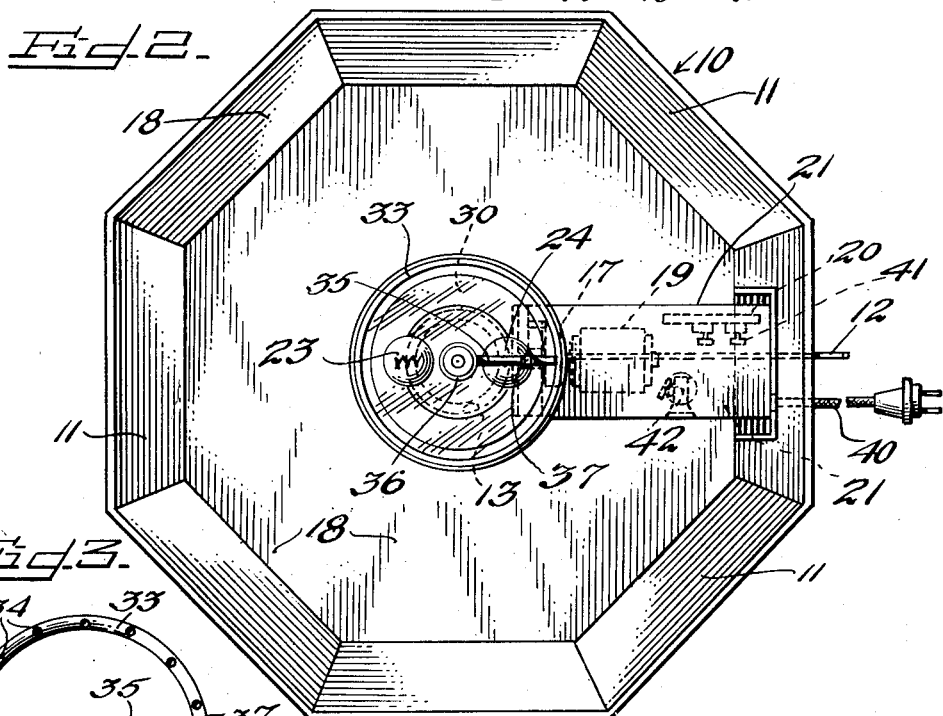
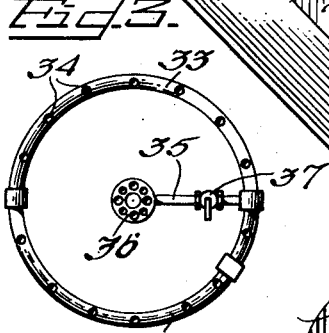
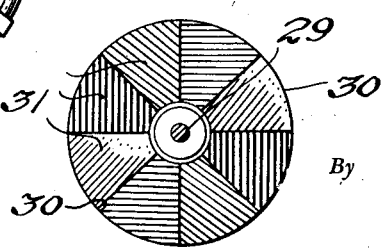
Inventor
Rubee Jeffery Pearse
By Clarence A. O'Brien
and Harvey B. Jacobson
Attorneys Oct. 23, 1951 — R. J. PEARSE — 2,572,379
PORTABLE FOUNTAIN
Filed Aug. 22, 1945 — 2 SHEETS—SHEET 2
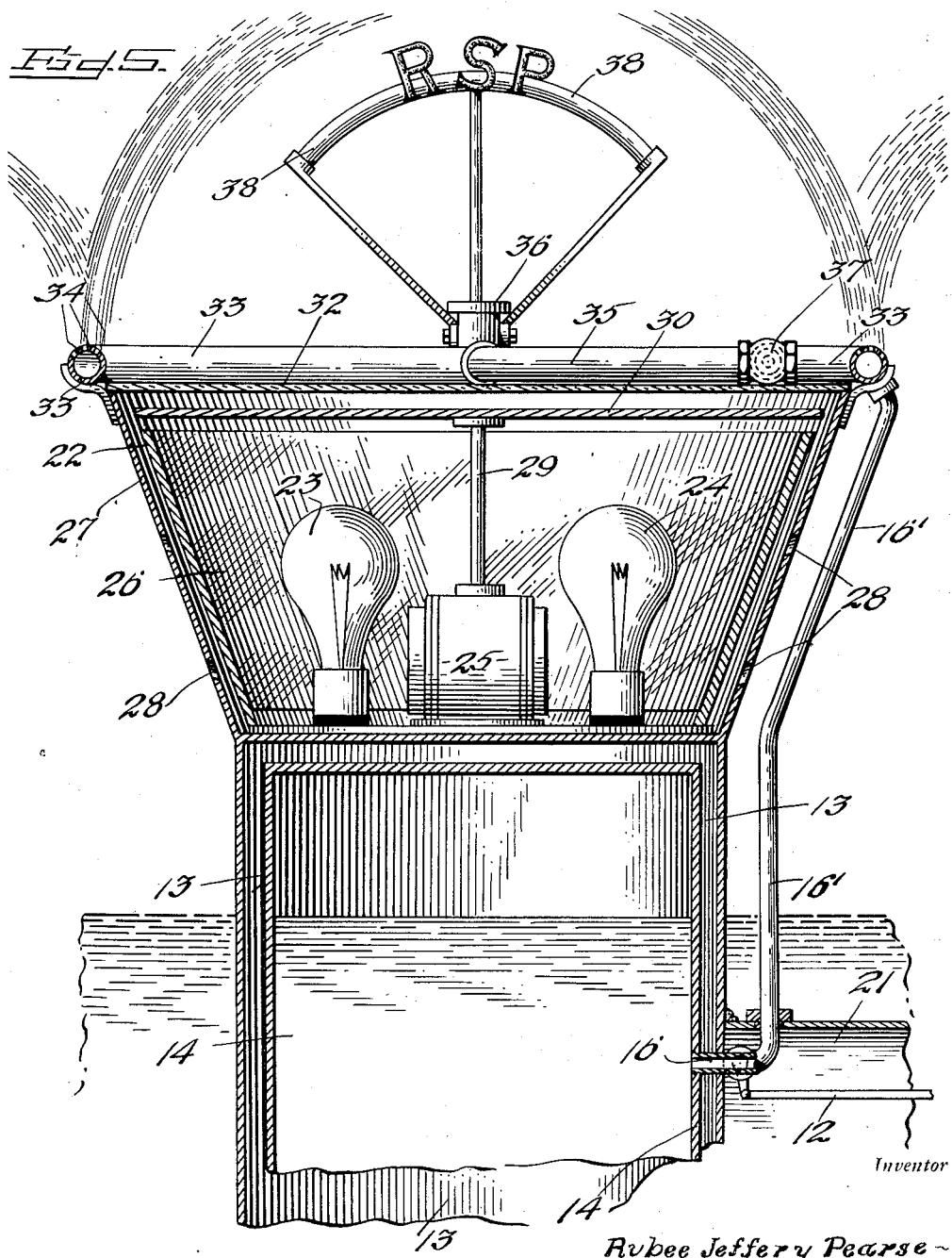
Inventor
Rubee Jeffery Pearse
By Clarence A. O'Brien
and Harvey B. Jacobson
Attorneys Patented Oct. 23, 1951

2,572,379

UNITED STATES PATENT OFFICE 2,572,379

PORTABLE FOUNTAIN

Rubee Jeffery Pearse, Raleigh, N. C.

Application August 22, 1945, Serial No. 612,057

3 Claims. (Cl. 299—4)

This invention relates to an improved form of portable illuminated fountain.

An object of the invention is to provide a portable lawn or like fountain adapted to selectively discharge one or more spray arrangements which will be variably illuminated by a shifting sequence of color screens being interposed between the discharge spray arrangements and a self contained light source.

Another object of the invention is to provide in a lawn or like fountain an under-water pump and motors for forcing sprays and mists of water therefrom.

A further object of the invention is to provide in a self-contained unit a portable fountain including a lighting system, a color changer, a pump, motors, control panel, etc., and a spray enveloped sign.

Other features and advantages will become more readily apparent from the following description and the accompanying illustrative drawings in which:

Figure 1 is a transverse sectional view of my portable fountain,

Figure 2 is a top plan view thereof.

Figure 3 is a detail plan view of a spray element,

Figure 4 is a similar view of a color changer, and

Figure 5 is an enlarged detail sectional view of a fountain and lighting system.

In the accompanying drawings as above enumerated and in the following specification, like characters of reference indicate like parts throughout and in which 10 indicates my invention comprising a basin 11 which is portable. Located centrally of the basin is a water-tight compartment 13 in which is provided a pressure tank 14 with an inlet 15 and an outlet 16. The inlet pipe 15 is connected to a pump 17 having communication with the water 18, contained in said basin through a pipe 17'. This pump together with the motor 19 for driving same and an instrument board 20 are all embraced in a water-tight compartment 21. A control rod 12 is provided for cutting-off pipe line 16'.

Mounted above the compartment 13 is a funnel-shaped compartment 22 within which is mounted a series of electric bulbs 23, 24, etc., a slow motor 25, and a funnel-shaped reflector 26. The wall 27 of the compartment 22 is provided with air openings 28. Operated by the motor 25 is a shaft 29, upon the upper end of which is mounted a disk 30 formed of colored glass or plastic and a series of different colored segments 31. The wall 27 has mounted on its upper edge a water-sealed glass plate 32, and mounted above said member 32 is a circular spray pipe 33 to which the outlet pipe 16' is connected and which member 33 is provided with a series of annularly disposed jet openings 34. Connected to said member 33 is a pipe 35 extending to the center of the member 33 and terminating in a spray member 36. The member 35 is provided with a cut-in valve 37 whereby either one or both of the sprays 33 and 36 may be used. Also supported upon the end of the pipe 35 is a neon type sign 38. A plug-in electric connection 40 projects into the compartment 21 and connects with the instrument board 20 upon which is provided a series of switches 41 for controlling the motors and lights. Also having connection with one of the switches on said instrument board is an electric fan 42, whereby the compartment 21 may be cooled to prevent overheating. This compartment 21 is provided with an air opening 43 in the side wall 44 of said basin or tank 11.

From the foregoing it will be seen that I have provided a portable fountain for use on a lawn or other place which is extremely ornamental and which may readily be moved from place to place as the only connection with the basin 11 is that of the electric plug-in. The basin is normally kept filled with water up to at least above the inlet 17' to the pump 17 and may be resupplied from time to time. Furthermore, the above described fountain may be used as an advertising medium.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A portable illuminating fountain including a concentrically disposed outer water container basin and a water tight compartment disposed centrally of said basin, a funnel shaped compartment on said water-tight compartment having its annular wall extending parallel with the wall of said basin, a funnel shaped reflector supported within said funnel-shaped compartment and concentric therewith and having its reflecting surface on the inside, said funnel-shaped compartment comprising a shield for said reflector, a pressure tank arranged within said water-tight compartment in spaced relation therewith, a watertight compartment between said centrally disposed water-tight compartment and the side wall of said basin, spray-heads connected with said pressure tank, a motor driven pump in said last mentioned water-tight compartment having connection with said pressure tank and said basin, and means within the reflector for illuminating said fountain when the spray is in operation.

2. The subject matter as claimed in claim 1 and wherein said means includes a motor in said funnel shaped compartment, a shaft extending upwardly from and driven by said motor, a source of light in said funnel shaped reflector, and a horizontal transparent radially segmented color screen mounted on said shaft for rotation therewith and disposed within the funnel shaped compartment and above the source of light, and a transparent plate closing the top of said funnel shaped compartment and water sealed thereon to prevent entrance of water thereinto.

3. The subject matter in claim 2 and wherein said funnel shaped compartment has apertured walls to allow cooling of said reflector, said walls comprising the support for said transparent plate and for said spray heads.

RUBEE JEFFERY PEARSE.

REFERENCES CITED

The following references are of record in the file of this patent:

UNITED STATES PATENTS

| Number | Name | Date |
|---|---|---|
| 492,999 | Trouve | Mar. 7, 1893 |
| 557,263 | Gilmore et al. | Mar. 31, 1896 |
| 586,310 | Humphreville | July 13, 1897 |
| 755,114 | Damm | Mar. 22, 1904 |
| 949,267 | Dunlap | Feb. 15, 1910 |
| 1,747,377 | Maxon | Feb. 18, 1930 |
| 1,855,522 | Lando | Apr. 26, 1932 |
| 2,167,055 | Trowbridge | July 25, 1939 |

FOREIGN PATENTS

| Number | Country | Date |
|---|---|---|
| 29,099 | Great Britain | Dec. 17, 1912 |
| 622,681 | France | June 3, 1927 |